United States Patent
Hoult

(10) Patent No.: US 8,212,421 B2
(45) Date of Patent: Jul. 3, 2012

(54) TEMPERATURE DEPENDENT SWITCHING CIRCUIT

(75) Inventor: Nigel Hoult, Addlestone (GB)

(73) Assignee: Thales Holding UK Plc, Addlestone (GB)

( * ) Notice: Subject to any disclaimer, the term of this patent is extended or adjusted under 35 U.S.C. 154(b) by 539 days.

(21) Appl. No.: 12/327,106

(22) Filed: Dec. 3, 2008

(65) Prior Publication Data

US 2009/0315665 A1    Dec. 24, 2009

(30) Foreign Application Priority Data

Dec. 19, 2007 (GB) ................... 0724803.2

(51) Int. Cl.
*H01H 37/00* (2006.01)
(52) U.S. Cl. ........................ 307/117; 361/161
(58) Field of Classification Search .............. 307/117; 361/161
See application file for complete search history.

(56) References Cited

U.S. PATENT DOCUMENTS 3,917,970 A * 11/1975 Sidor et al. ................ 307/117
6,819,091 B2 * 11/2004 Ishihara et al. ............ 323/285
7,006,341 B2 * 2/2006 Nishino .................... 361/103

FOREIGN PATENT DOCUMENTS

FR     2348832 A    11/1977
GB     2393339 A    3/2004

OTHER PUBLICATIONS

"Maxim Resistor-Programmable SOT Temperature Switches", Maxim Integrated Products, 8 pages, Nov. 2003.*

* cited by examiner

*Primary Examiner* — Hal Kaplan
(74) *Attorney, Agent, or Firm* — LaRiviere, Grubman & Payne, LLP

(57) ABSTRACT

A temperature activated switching circuit 100, comprising a temperature activated switch U1 for switching an output 102 at a threshold temperature, the temperature activated switch U1 having at least one power input VCC for receiving power; and power switching circuitry for connecting a power source to said power input VCC of the temperature activated switch U1, the power source being initially disconnected from the power input VCC, and the power switching circuitry being configured to connect said power source to the power input VCC based on a detected temperature, in order to power up the temperature activated switch U1 before said detected temperature reaches said threshold temperature.

34 Claims, 10 Drawing Sheets

TEMPERATURE DEPENDENT SWITCHING CIRCUIT

This application claims priority to United Kingdom Patent Application number GB0724803.2, entitled "Temperature Dependent Switching Circuit" filed on Dec. 19, 2007.

The present invention relates to a circuit for switching off power to electrical equipment if the temperature passes a threshold value.

Electrical equipment may become damaged if it is operated outside an allowable temperature range. To prevent such damage, it is known to provide a temperature trip switch for shutting down the electrical power to the equipment if the temperature passes a threshold value. For example, commercially available temperature switches, such as the Maxim MAX6509, may be used to detect an operating temperature and switch an output to trigger an alarm or shut down a sensitive part of the circuitry when a threshold temperature is reached.

The typical supply current consumed by the MAX6509 temperature switch is around 32 micro amps. In some electrical devices, this is small compared with the normal operating current. However, in battery operated devices, it nevertheless causes an additional drain on the battery. This is particularly an issue for very low power battery operated equipment, as it may significantly shorten the life of the battery.

The present inventor has addressed such problems of power consumption by a temperature switching device.

One aspect of the present invention provides a circuit and method for temperature activated switching, by supplying power to a temperature switch only when the temperature approaches a temperature limit at which the temperature switch is operable to switch its output. This reduces the power consumption, because the temperature switch need not be constantly powered up under normal operating conditions.

The temperature switch has a power input and a switching output for switching at a threshold temperature, and power connection circuitry for connecting or disconnecting power to the power input of the temperature switch. An input may be provided for receiving a signal indicating that the current temperature is approaching the threshold temperature of the temperature switch, where the signal is used by the power connection circuitry to control the power supplied to the temperature switch. A further input may be provided to indicate that the temperature is no longer approaching the threshold temperature of the temperature switch. The temperature switch may be a MAX6509 temperature switch or an alternative equivalent temperature switch or some other type of temperature switch.

The temperature threshold at which the temperature switch will switch its output may be a fixed value, e.g. set by fixed components in the circuit. Alternatively, it may be a variable value, e.g. influenced by other factors such as the temperature history, the rate of change of temperature, the number of times that the threshold has previously been exceeded, a user adjustable control, etc.

The circuit may use transistors or logic circuits to control the switching, both for the power output to the temperature sensitive apparatus, and for the power supply to the temperature switch. For example, the transistors may comprise FETs or bipolar transistors or a combination of the two, while the logic circuits may comprise arrangements of one or more logic gates, for example, NAND gates, NOR gates, or a combination of the two.

The electrical equipment being protected preferably includes means for monitoring its own temperature, which may involve continuous temperature measurements, sampled measurements or otherwise. This can be used to generate a signal to initiate the temperature switch being powered up when the threshold temperature is being approached. The signal may be a continuous signal, or a single pulse, or some other format of signal such as a series of pulses, indicating that the temperature is within a particular range of the threshold temperature. A second signal may be provided to indicate if the temperature has moved sufficiently far away from the threshold temperature to allow the temperature switch to be de-powered again. This second signal may have a similar or different format to the first signal.

The second signal may be generated at a different temperature from the first signal, e.g. to produce a hysteresis effect in switching on and off of the power to the temperature switch. In some embodiments, the rate of temperature change as well as the absolute temperature may be a factor in generating the first and/or second signals.

In some embodiments, the circuit is configured for switching on above a temperature threshold, and in other embodiments, the circuit is configured for switching on below a temperature threshold. In further embodiments, two temperature switches may be used, one switching above a high threshold temperature and the other switching below a low threshold temperature, so that the temperature sensitive apparatus is only supplied with power between these two thresholds. Preferably, the threshold temperatures for powering up each of the two temperature switches would be selected to leave a normal operating temperature range between them. Then, no more than one of the two temperature switches would be powered up at any given time.

In further embodiments, a user operable switch may be provided for resetting of the temperature trip switch. If the temperature passes the threshold for a first time so that the power is disconnected from the temperature sensitive apparatus, then even if the temperature subsequently passes back through the threshold again, the power may not be automatically restored. A user may activate this switch, e.g. manually or remotely, to once again supply power to the temperature sensitive apparatus. These embodiments are useful for situations where operation should not resume when the temperature returns to an acceptable value. Again, dual temperature switches may be used.

In other embodiments, control lines may be provided to provide signals to the temperature sensitive apparatus indicating that the threshold temperature has been reached. In some embodiments, the removal of power may be delayed until the temperature sensitive apparatus has completed an operation in progress. Such an operation could be, for example, writing data to a disc drive.

Embodiments of the invention are particularly useful for battery operated electrical apparatus. For example, embodiments of the invention may be used in laptop computers, handheld computers, portable music players, other portable or mobile computing devices, electrical equipment for use in a moving vehicle, mobile or portable communications equipment including radio transceivers and mobile telephones, and any other portable electrical appliances or devices. However, the invention is not limited to battery powered applications, and benefits of the invention may be obtained with any type of electrical apparatus.

Embodiments of the present invention will now be described, by way of example only, with reference to the accompany drawings, in which.

Figure 1:
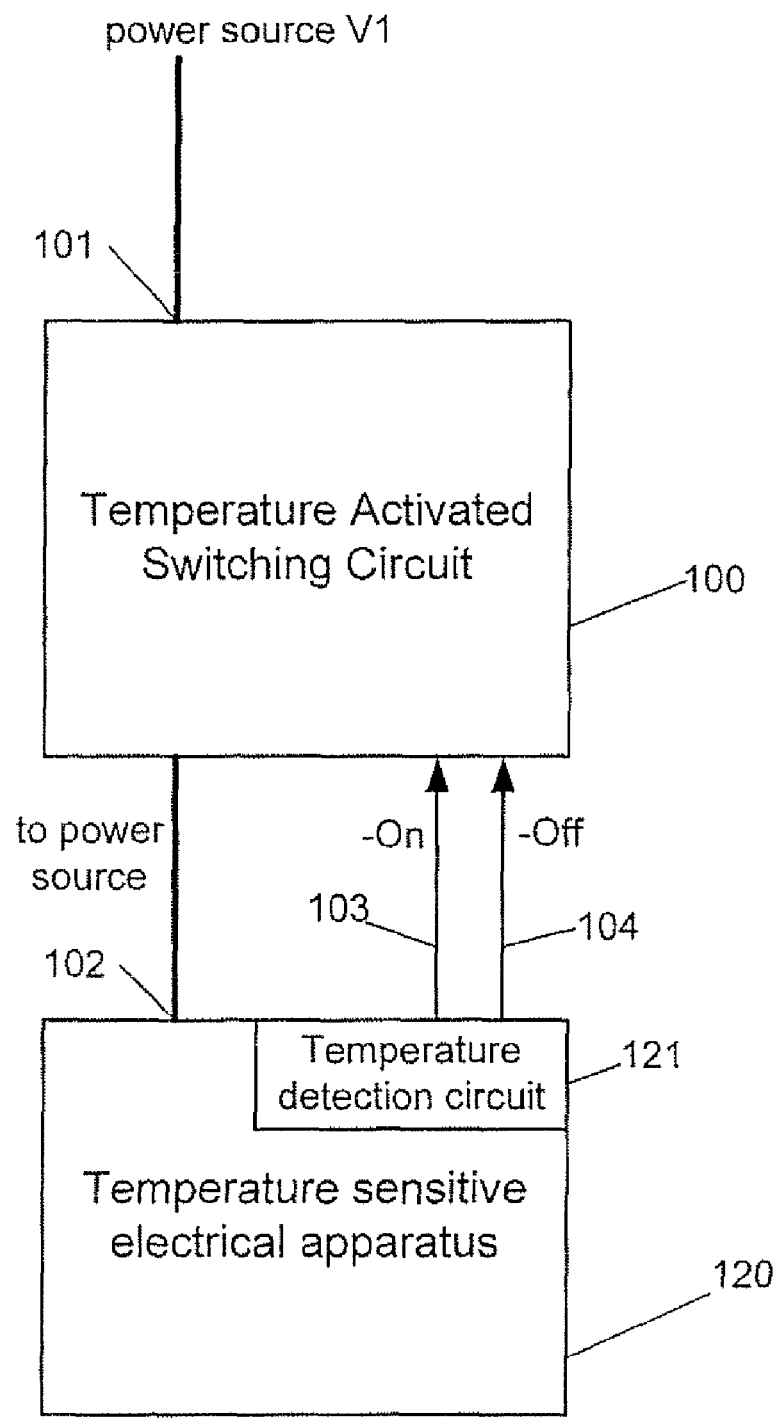
FIG. 1 is a block diagram showing a temperature sensitive electrical apparatus and a control mechanism for temperature dependent switching of a power source, in an embodiment of the invention.

FIG. 1 shows a temperature sensitive electrical apparatus 120, connected to a temperature activated switching circuit 100. The switching circuit 100 is configured for the switching on or off of power to the temperature sensitive electrical apparatus 120, according to a detected temperature. Although in FIG. 1, the switching circuit 100 is shown as a separate unit to the temperature sensitive apparatus 120, in practice the switching circuit may be provided as a part of the temperature sensitive apparatus rather than a separate unit, and may be located within it.

The temperature sensitive electrical apparatus 120 has a power input 102, which connects to a power source 101 of voltage V1 via the switching circuit 100. The input voltage to the temperature sensitive apparatus 120 is V1 when the output of the switching circuit 100 is switched to an "on" setting, and no power is supplied to the temperature sensitive apparatus 120 when the output of the switching circuit 100 is switched to an "off" setting. In alternative embodiments, the supplied voltage or current may be reduced when the power switching is operated, or at least some of a plurality of power input connections to the temperature sensitive apparatus 120 may be switched on or off by the switching circuit 100.

The switching circuit 100 includes a temperature switch, which controls the power output to the temperature sensitive apparatus 120. This temperature switch is only supplied with power when the temperature gets close to the switching temperature. In this embodiment, the temperature switch has its own in-built temperature detector, and a second means of temperature detection is used to control the switching of power to the temperature switch. In this embodiment, this second means is a temperature detection circuit 121 located within the temperature sensitive apparatus 120. However, in alternative embodiments, both functions may be performed by a single temperature sensor.

The circuit 121 may include a thermometer, thermostat or other type of temperature sensor, which generates one or more temperature dependent control signals 103, 104, to be fed back to the switching circuit 100 for controlling the power supplied to the temperature switch. This temperature sensor may be already present within the temperature sensitive apparatus for some other function, but may be configured for shared use with a circuit according to the present invention. The temperature sensor may be configured to detect temperature continuously or discontinuously. It may be configured to measure temperature within a particular temperature range, or to detect when the temperature reaches a particular threshold value.

In alternative embodiments, the temperature detection circuit 121 may be located within the switching circuit 100, or it may be external to both the switching circuit 100 and the temperature sensitive apparatus 120, e.g. within a power supply for powering the temperature sensitive electrical apparatus 120. However, preferably, it is positioned to be thermally coupled to the temperature sensitive apparatus 120.

In FIG. 1, the two temperature dependent control signals 103, 104 are generated by the temperature detection circuit 121, according to the detected temperature. The first control signal 103 is generated to indicate when the power should be connected to the temperature switch, and the second control signal 104 is generated to indicate when power should be disconnected from the temperature switch. The temperature dependent control signals 103, 104 are received by the switching circuit 100, and are used to control the power supplied to the temperature switch accordingly.

In preferred embodiments, the temperature switch in the switching circuit 100 is a commercially available temperature switch, such as the Maxim MAX6509. The MAX6509 includes a thermostat within its integrated circuit package, for switching its output according to its detected temperature. The switching temperature is set by connecting a resistor of selected value to a corresponding control input of the MAX6509 integrated circuit. The output of the MAX6509 is used for the switching on or switching off of power to the temperature sensitive electrical apparatus 120.

The control signals 103, 104 generated by the temperature detection circuit 121 may thus be used to control the connection and disconnection of a voltage to a power input on the MAX6509 integrated circuit. When the temperature approaches the MAX6509 switching temperature, the voltage is applied, thus allowing the MAX6509 to power up and perform its switching function if the switching temperature is reached. However, in normal operation, when the temperature is far removed from the MAX6509 output switching temperature, the voltage is disconnected and no power is supplied to the MAX6509 chip, thus reducing the overall current drain by the power switching circuit 100.

Thus, the power to the temperature switch remains disconnected until the detected temperature approaches its switching threshold. In some embodiments, the temperature switch thereafter remains powered, regardless of future temperature changes. In other embodiments, a manually activated reset mechanism may be provided to allow the voltage output to the temperature sensitive apparatus 120 to be turned on, and/or the power to the temperature switch to be turned off once again when the temperature is back to a normal operating range. In yet other embodiments, the power to the temperature switch may be disabled as long as the temperature is detected as being outside a critical temperature range, above a selected value, or below a selected value, and only powered on when this condition is not met. The power-on temperature of the temperature switch may be different from the power-off temperature.

Figure 2:
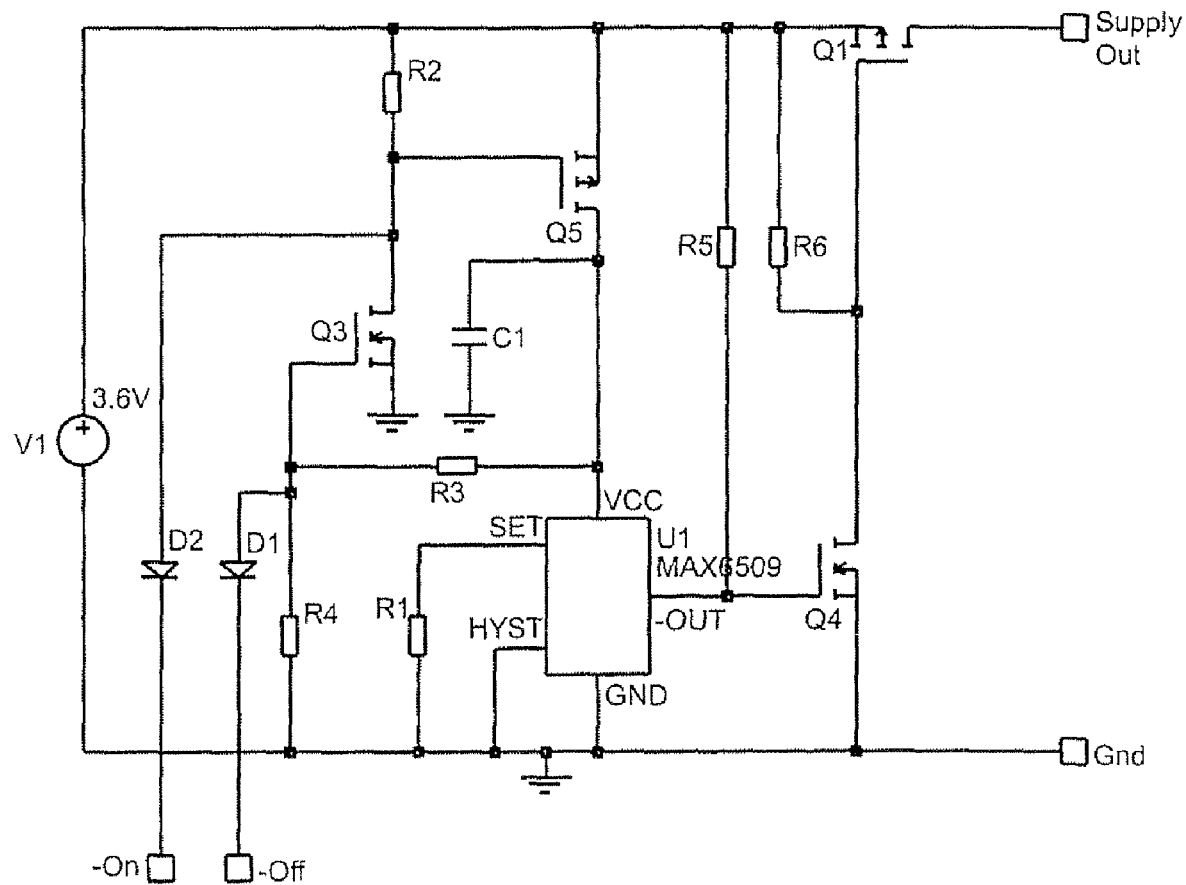
FIG. 2 is a circuit diagram showing a control circuit according to a first embodiment of the invention.

FIG. 2 shows a circuit according to a first embodiment of the invention. The circuit includes a MAX6509 temperature switch, U1. The temperature switch U1 has an output -OUT, which is used for controlling the connection of power to the temperature sensitive apparatus. A resistor R1, connected between ground and a "SET" input of the temperature switch U1, sets a threshold temperature for the temperature dependent switching of the MAX6509. The output -OUT is not switched until the temperature passes this threshold temperature. At this threshold, the output -OUT is pulled low.

The temperature switch U1 also includes a hysteresis input "HYST", for selecting the amount of hysteresis in the temperature switching. In this embodiment, the HYST input is connected to ground, setting the hysteresis to a minimum value (approximately 2° C. in the MAX6509). A larger amount of hysteresis may be set, if desired, by using a higher voltage on the hysteresis input.

This temperature switch U1 has a power input VCC, and a ground input GND. In this embodiment of the invention, the circuit shown in FIG. 2 is used for disconnecting power from the input VCC of the temperature switch, in order to reduce power consumption by the temperature switch U1 at suitable temperatures. In other embodiments, either a positive or a negative terminal of the power source, or both, may be disconnected from a temperature switch to prevent or reduce the consumption of power at suitable temperatures.

The circuit of FIG. 2 includes a voltage source V1, such as a battery. In this particular example, V1 provides 3.6 volts DC, although alternative voltages may be used in other embodiments. The negative terminal of the voltage source is connected to ground. The positive terminal of the voltage source V1 is connected via a p-channel MOSFET transistor Q1 to a "supply out" power output terminal, which connects to the temperature sensitive electrical apparatus 120 (not shown in FIG. 2) to provide it with power. Transistor Q1 is controlled by a second transistor Q4 connected to the output "-OUT" of the temperature switch U1.

The circuit of FIG. 2 has inputs "-On" and "-Off", which receive the control signals 103, 104 from the temperature detection circuit 121 of the temperature sensitive apparatus 120. The minus sign denotes an "active low" on these inputs. This may alternatively be represented by an over-bar or a "_" symbol. Alternatively, the inputs may be simply denoted "On" and "Off", without indicating an active low. This is particularly useful in embodiments where the inputs are not active low.

In this embodiment, the temperature detection circuit 121 is configured to generate a low voltage pulse on the "-On" input if the temperature reaches a predetermined range of the U1 switching temperature, thus requiring the temperature switch U1 to be powered up. The circuit 121 is further configured to generate a low voltage pulse on the "-Off" input if the temperature goes back outside this predetermined temperature range, thus allowing the temperature switch U1 to be de-powered again. In alternative embodiments, the form of signals 103 and 104 may be different e.g. high voltages may be used instead of low voltages, and/or continuous signals or some other waveform may be used rather than pulses. In some embodiments, the "-Off" signal is not implemented, and only the "-On" signal is used.

The power input VCC of the temperature dependent switch U1 is connected to the positive voltage source V1 via a p-channel MOSFET transistor Q5, so that Q5 can be switched on to power up U1, and switched off to cut the power to U1. Capacitor C1 is connected between VCC and ground. Resistors R3 and R4 are connected in series between VCC and ground.

The gate of Q5 is connected to the voltage source V1 via a resistor R2, so that it is initially kept at a high voltage and Q5 is initially switched off. The gate of Q5 is also connected via a diode D2 to the "-on" input. The gate of Q5 is also connected to ground via an n-channel MOSFET transistor Q3. The gate of Q3 is connected to ground via resistor R4 and to the VCC terminal of U1 via resistor R3. Initially, there is no power connected at VCC, so Q3 is initially kept switched off by R4.

Figure 3:
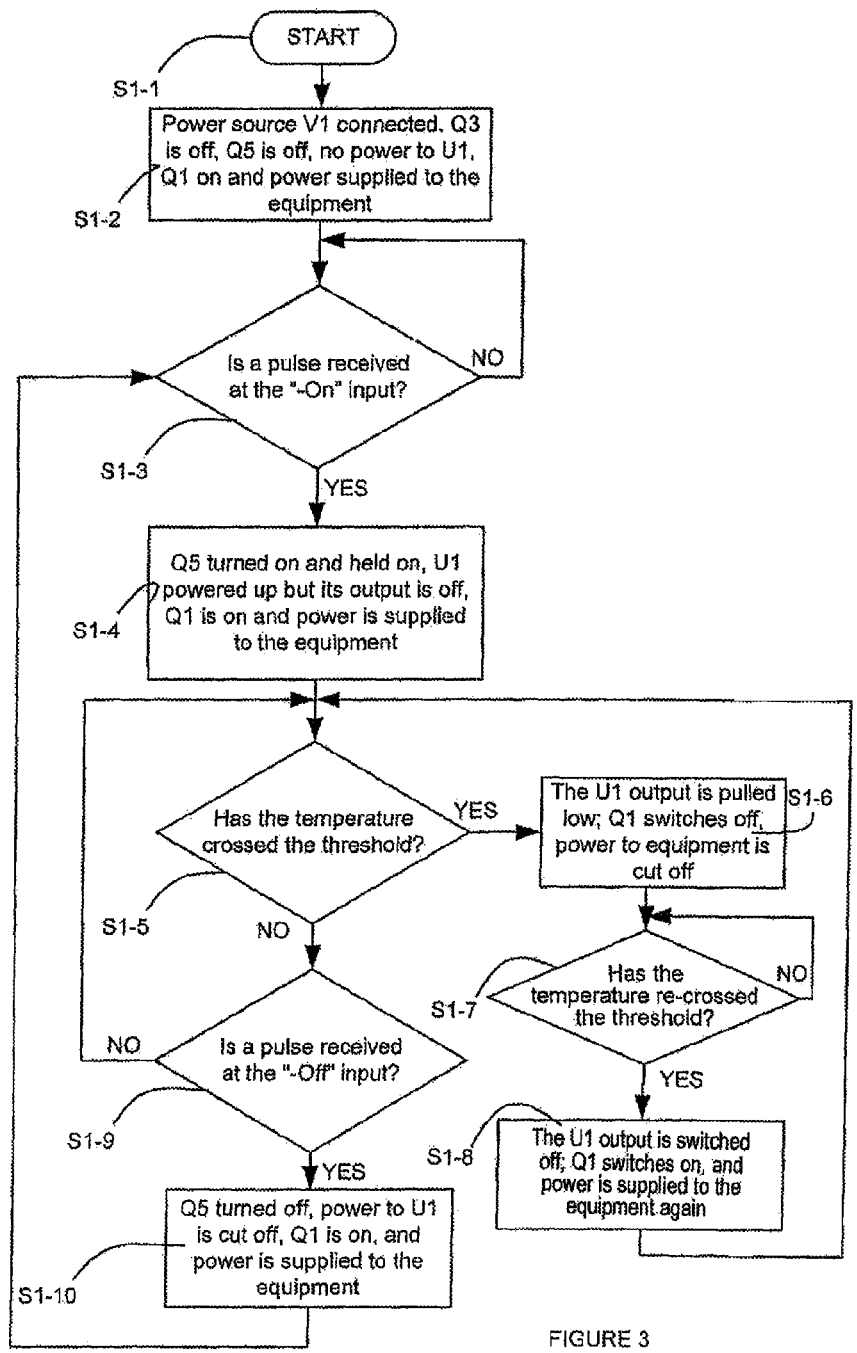
FIG. 3 is a flow diagram showing a control process carried out by the circuit of FIG. 2.

The flow chart of FIG. 3 describes the operation of the circuit of FIG. 2 in more detail. The process starts at step S1-1. At S1-2, power source V1 is connected and no signal is present on the -On and -Off inputs.

The capacitor C1 is in a discharged state and the transistors Q3 and Q5 are switched off, therefore no power is applied to U1. Hence the output (-OUT) of U1 is not pulled low, transistor Q4 is turned on via resistor R5, which turns on transistor Q1 and applies power to the temperature sensitive apparatus 120, which is connected between the supply out and ground pins. Resistor R4 (and R3, since C1 is discharged) has the effect of keeping the gate Q3 low and thus keeping it turned off. This keeps Q5 also turned off and thus U1 remains unpowered. This is a stable condition for the circuit. The process continues at step S1-3.

If a pulse is not detected at the -On input, the process remains at step S1-3 until detection of the pulse. When a low voltage pulse is received at the "-On" terminal, the process continues at step S1-4. The voltage at the gate of Q5 is then pulled low by the "-On" pulse, thus switching on transistor Q5. The source terminal of Q5 is connected to the voltage source V1, and the drain terminal is connected to the VCC power input of U1. Thus, the effect of Q5 switching on is to provide a voltage V1 at VCC, via Q5, to power up the temperature switch U1. Capacitor C1, connected between ground and VCC, stores charge when Q5 is on.

Due to the positive voltage at VCC, the resistors R3 and R4 act as a potential divider and supply a suitable voltage to the gate of Q3 to turn it on. R3 is significantly lower in value than R4, providing a positive voltage at the gate of Q3. The source terminal of Q3 is connected to ground and the drain terminal is connected to the gate of Q5. Thus, with Q3 switched on, a low voltage is supplied via Q3 to the gate of Q5, keeping Q5 switched on. The result is that only a single low pulse is required on the -On input to continuously supply power to U1. The "-off" terminal is also connected to the gate of transistor Q3 via a diode D1, but no signal is present on the "-off" input at this stage.

When powered on initially, the temperature switch U1 has its output -OUT switched "off", in a high impedance state. The -OUT output is connected to the gate of the n-channel MOSFET transistor Q4, which is also connected to voltage V1 via a resistor R5. Thus, initially, when the temperature has not yet passed the U1 switching threshold and the -OUT output has high impedance, the gate of Q4 has a high voltage due to R5, and Q4 is accordingly switched on. The source and drain terminals of Q4 are connected respectively to ground and to the gate of p-channel MOSFET transistor Q1. The gate of Q1 is also connected to V1 via a resistor R6. When Q4 is on, then the gate of Q1 is pulled low and Q1 is switched on, thus providing a voltage V1 at the "supply out" terminal, to power the temperature sensitive electrical apparatus 120.

From step S1-4, the process then continues to step S1-5. If at step S1-5, the temperature is found to exceed the threshold temperature of U1 set by resistor R1, the process continues to step S1-6, in which the output of the temperature switch -OUT is pulled low. The gate of Q4 is thus pulled low, switching Q4 off. The voltage at the gate of Q1 is then pulled high by R6 connected to V1, so that Q1 is switched off. This has the effect of cutting the power supply to the temperature sensitive apparatus 120. The process then continues to step S1-7.

At step S1-7, if the temperature once more crosses the threshold (plus any hysteresis), so that it is within an acceptable range once again, then the process continues to step S1-8. At step S1-8, -OUT goes high impedance again, Q4 and Q1 are turned on, power is restored, and the process continues as before at step S1-5.

If at step S1-5, the temperature has not crossed the threshold, the process goes to step S1-9. At step S1-9, if no signal is detected at the Off input, then the process goes back to step S1-5. However, if at step S1-9, a low voltage pulse is detected at the -Off input, the process proceeds to step S1-10.

The low pulse applied to the "-Off" input causes the gate of transistor Q3 to be pulled low, thus switching off transistor Q3. The voltage at the gate of Q5 is then pulled high via R2, so that Q5 switches off. Thus, the power supply to VCC of U1 is cut off, restoring the circuit to the state in which it started. Thus, the process moves from step S1-10 back to step S1-3 and continues in this state until a further pulse is received at the -On input.

Figure 4:
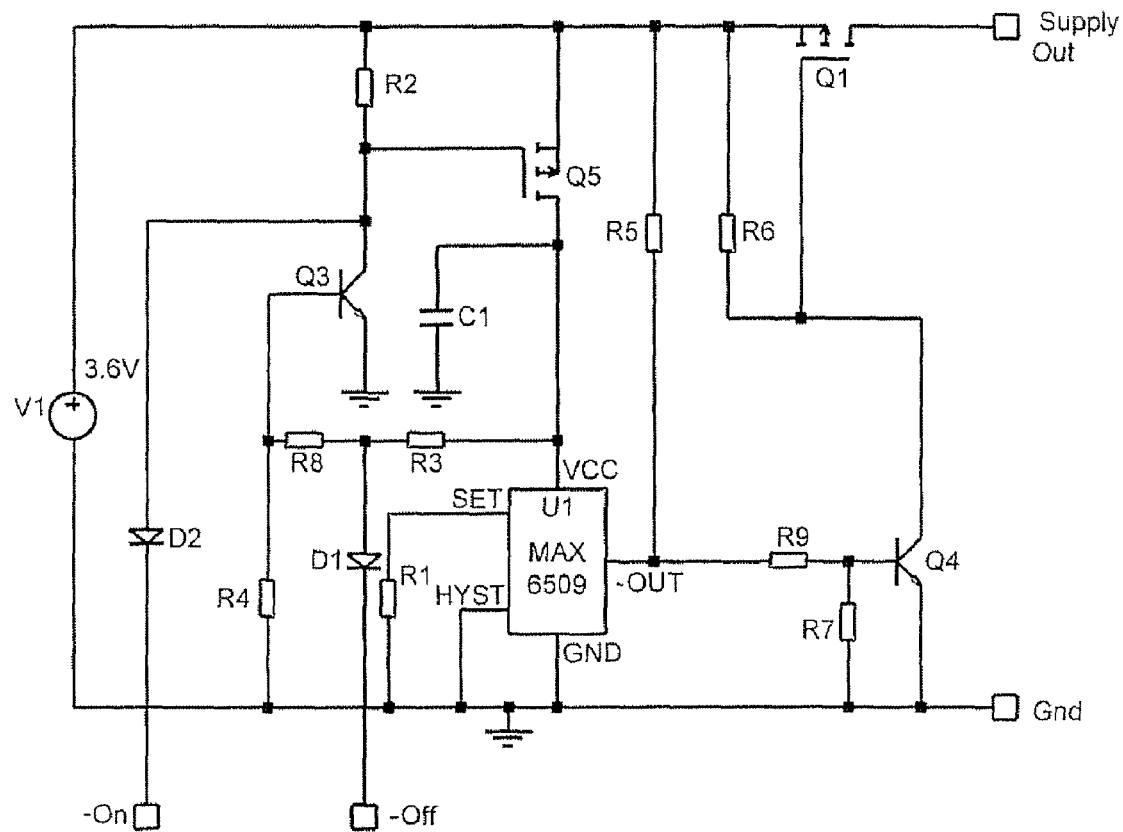
FIG. 4 is a circuit diagram corresponding to a second embodiment of the invention.

FIG. 4 shows a further embodiment of the invention, in which bipolar transistors replace the MOSFETs of FIG. 1 for Q3 and Q4. Three additional resistors are present in the circuit of FIG. 4, to provide suitable biasing to the bipolar transistors. These are R7 connected between the base of Q4 and ground, R8 connected between the base of Q3 and diode D1, and R9 connected between the output of U1 and the base of Q4. Otherwise, the circuit of FIG. 4 is the same as that of FIG. 2. The circuit of FIG. 4 works in the same way as the circuit of FIG. 2.

Figure 5:
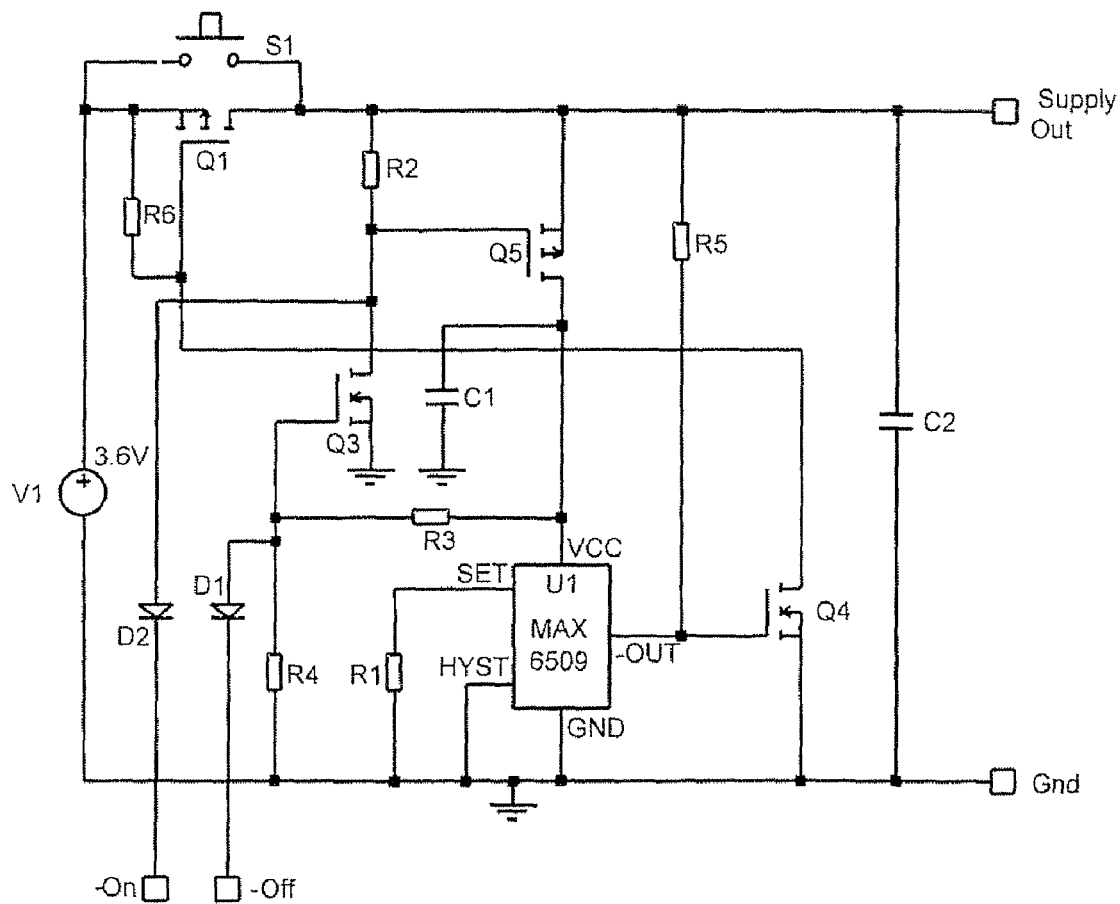
FIG. 5 is a circuit diagram corresponding to a third embodiment of the invention.

A third embodiment of the invention is shown by the circuit diagram of FIG. 5. The circuit of FIG. 5 is similar to that of FIG. 2, except for the following differences. FIG. 5 includes a switch S1 connected between the source and drain of transistor Q1. Instead of being directly connected to the power source V1 the resistors R2 and R5 and the source terminal of transistor Q5 are connected to V1 via the parallel arrangement of the switch S1 and the transistor Q1. R6 remains directly connected to V1. Thus, when the switch is closed or when Q1 is on, a voltage V1 will be supplied at the supply out terminal. An additional capacitor C2 is connected between the supply out and ground outputs in the circuit. Otherwise, the circuit of FIG. 5 is the same as that of FIG. 2.

In FIG. 5, switch S1 is initially in an open position. When the power source V1 is first connected, the capacitor C2 remains discharged and hence no power is supplied to the temperature sensitive circuit. Resistor R6 holds Q1 turned off, and hence the circuit remains in this state until switch S1 is closed. This powers up the rest of the circuit, which operates as described for FIG. 2 and remains powered assuming that the temperature is within the threshold. S1 is not held in a closed position, but is opened again after powering the circuit. S1 may be biased in the open position so that it will automatically return to an "open" state after being switched to a closed state.

The -On and -Off inputs are used as described earlier. If, after activating U1 by means of a pulse on the -On input, the temperature crosses the threshold, then Q1 turns off. Since Q1 in FIG. 5 also switches off the input voltage to R2, Q5 and R5, then the whole circuit is powered down and remains in this state until S1 is closed again. This embodiment is therefore useful for situations where operation cannot resume when the temperature comes back to an acceptable value.

Figure 6:
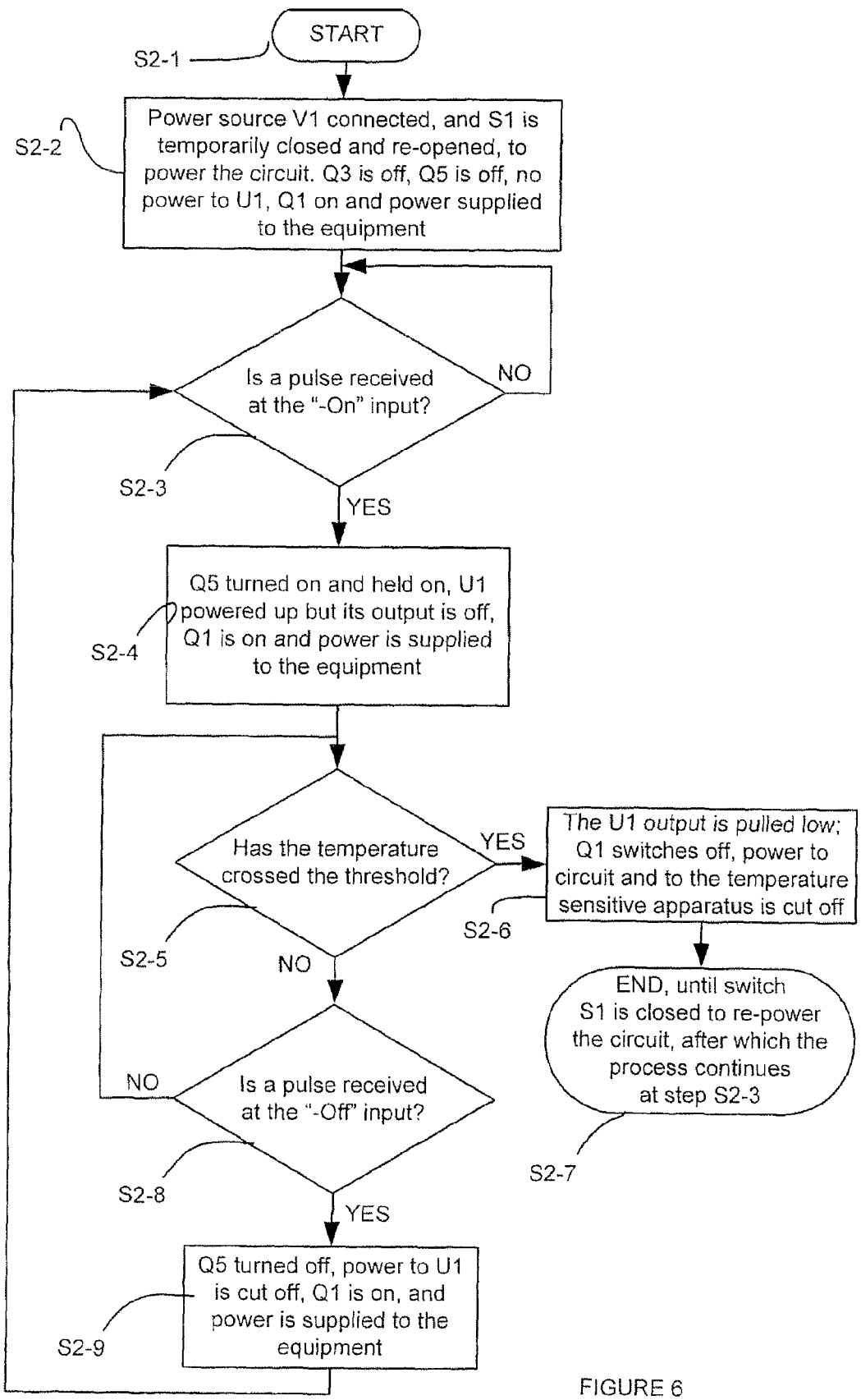
FIG. 6 is a flow diagram showing a control process carried out by the circuit of FIG. 5.

FIG. 6 is a flow chart showing the process occurring in the circuit of FIG. 5. This is similar to the process shown in FIG. 3, except that S1 needs to be temporarily closed at step S2-2, and after Q1 is switched off, the circuit remains depowered at step S2-7 until switch S1 is closed again, even if the temperature changes again to an acceptable value.

In any of the described embodiments, two temperature switches may be used instead of one, to set both an upper and lower threshold for the acceptable temperature range. Each temperature switch has its own associated circuitry with corresponding transistors Q3 and Q5 etc. The -OUT of U1 is open drain in these examples, and thus allows this use of two temperature switches. In normal use, the temperature thresholds would be selected to cause only one at most of the two temperature switches to be powered up at any given time.

Figure 7:
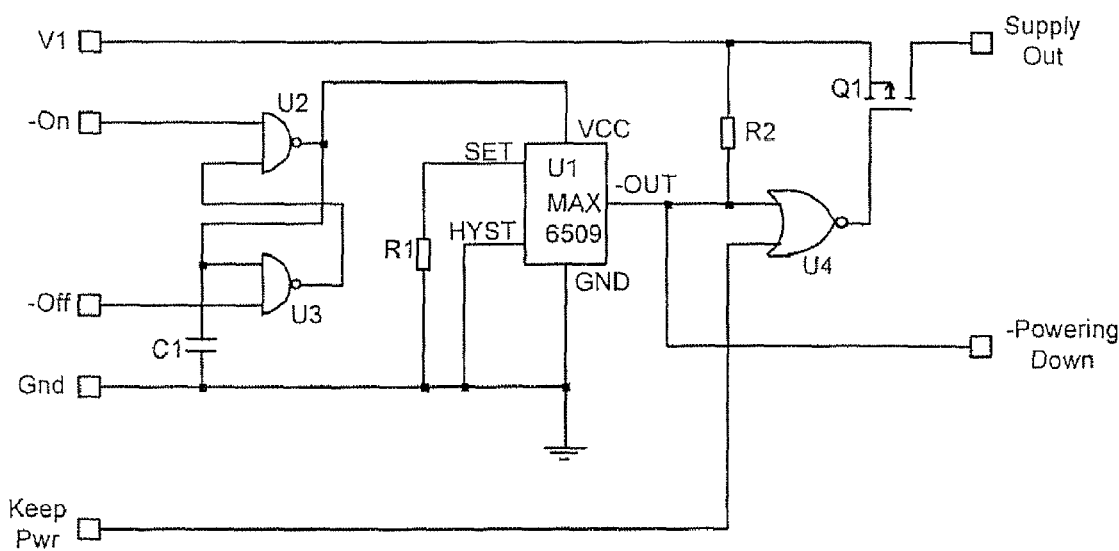
FIG. 7 is a circuit diagram corresponding to a fourth embodiment of the invention.

FIG. 7 shows a circuit according to a fourth embodiment of the invention. This circuit uses a logic gate arrangement to perform the switching of power to a MAX6509 temperature switch U1, instead of the Q3/Q5 transistor arrangement of the previous figures. In FIG. 7, the MAX6509 temperature switch has inputs GND, HYST, SET and VCC, and a -OUT output, as discussed with reference to FIG. 2. As before, the HYST and GND inputs are connected to ground, and the SET input is connected to ground via a resistor R1.

The circuit of FIG. 7 includes an input V1 which is connected to the positive terminal of a voltage source V1. The voltage source may be a 3.6V D.C. voltage source as in the earlier figures, or it may have a different voltage. The negative terminal of the voltage source is connected to ground. Although not explicitly shown in FIG. 7, the V1 terminal is connected to the positive power connections of the logic gates U2, U3 and U4, and the negative power connections of the logic gates are connected to ground. The V1 power terminal is also connected via a p-channel MOSFET transistor Q1 to a "supply out" power output terminal, which connects to the temperature sensitive electrical apparatus 120 (not shown in FIG. 7) to provide it with power. Transistor Q1 is controlled by the output of a NOR gate U4, connected to the gate terminal of Q1. One input of U4 is connected to the output "-OUT" of the temperature switch U1. The other input of this NOR gate is connected to an input terminal labelled "Keep Pwr", which may be driven to a high voltage by the temperature sensitive apparatus to prevent the power being switched off at Q1, or may be tied low if not required.

As in FIG. 2, the circuit of FIG. 7 has inputs "-On" and "-Off", which receive the control signals 103, 104 from the temperature detection circuit 121 of the temperature sensitive apparatus 120, in a similar manner as described with reference to the previous embodiments. Both "-On" and "-Off" initially have a high voltage state, but each may be temporarily switched by a low voltage pulse, before returning to a high voltage state once more. The "-On" terminal is connected to an input of a first NAND gate U2, and the "-Off" terminal is connected to an input of a second NAND gate U3. The NAND gates U2 and U3 are configured as a bistable circuit, with the output of U2 being connected to the second input of U3, and the output of U3 being connected to the second input of U2. The power input VCC of the temperature dependent switch U1 is connected to the output of the first NAND gate U2, and a capacitor C1 is also connected between VCC and ground.

Figure 8:
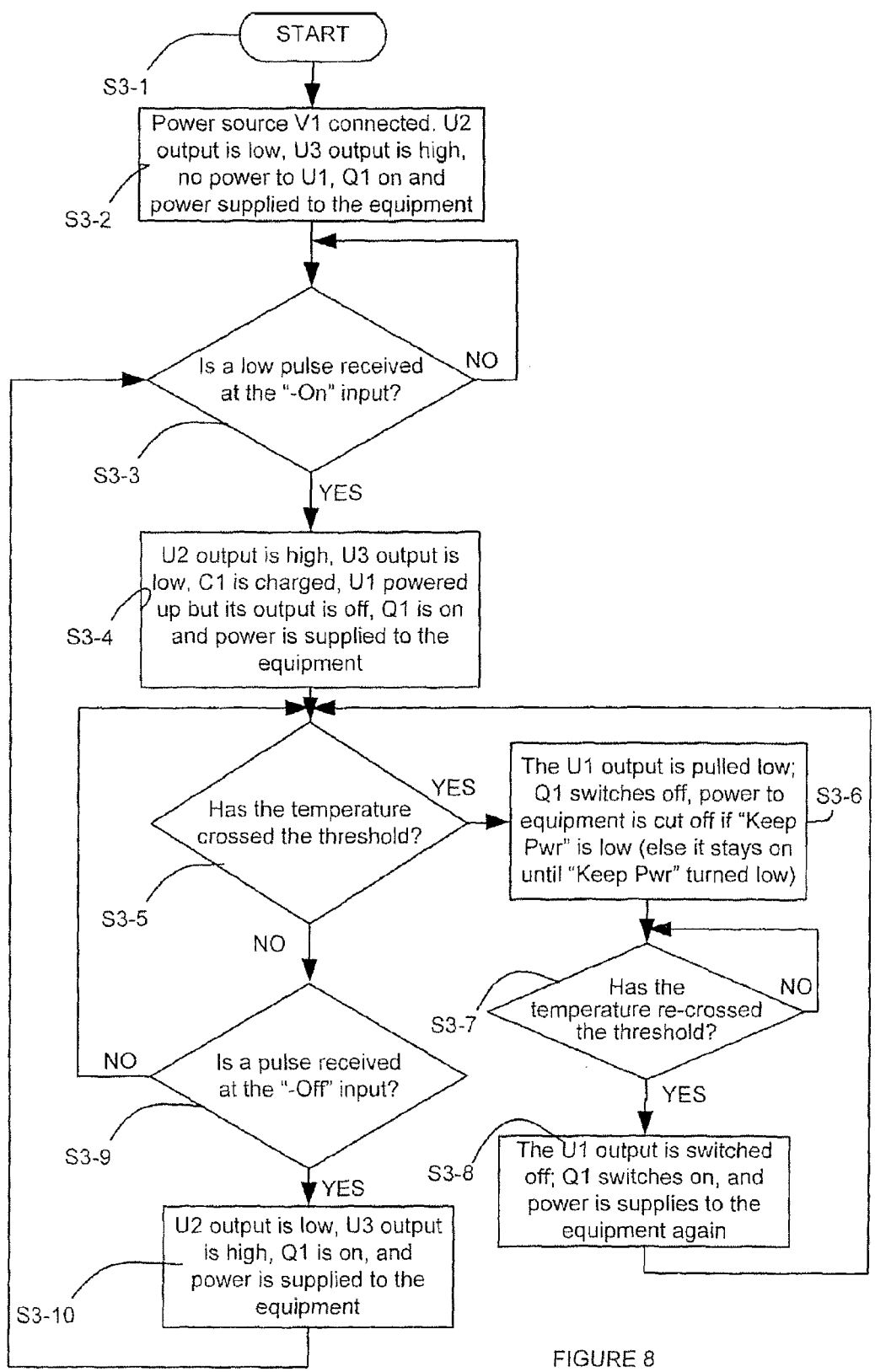
FIG. 8 is a flow diagram showing a control process carried out by the circuit of FIG. 7.

The flow chart of FIG. 8 describes the operation of the circuit of FIG. 7 in more detail. The process starts at step S3-1. At S3-2, a power source is connected at the V1 terminal, and a high voltage is present on the -On and -Off inputs.

The capacitor C1 is in a discharged state and hence one input of the gate U3 is held low. This keeps the output of U3 high, and hence the output of U2 low, since both its outputs are high Therefore, C1 remains discharged, and U3 remains unpowered. This is a stable condition for the circuit. The process continues at step S3-3.

If a low voltage pulse is not detected at the -On input, the process remains at step S3-3 until detection of the pulse. When a low voltage pulse is received at the "-On" terminal, the process continues at step S3-4. One input of the gate U2 is then pulled low by the "-On" pulse, thus switching its output high. This applies power to VCC, charges the capacitor C1 and drives the output of U3 low. The output of U3 holds the other input of U2 low, thereby ensuring that the circuit remains in this stable state after completion of the voltage pulse. The result is that only a single low pulse is required on the -On input to continuously supply power to the temperature switch U1.

When powered on initially, the temperature switch U1 has its output -OUT switched "off", in a high impedance state. The -OUT output is connected to one input of a NOR gate U4, and is also connected to voltage V1 via a resistor R2 and to a terminal "-Powering Down", which may be monitored by the temperature sensitive apparatus to allow it to directly detect the state of the temperature switch output. The other input to the NOR gate is connected to a terminal "Keep Pwr", which is held low by the temperature sensitive apparatus at this time. Thus, initially, when the temperature has not yet passed the U1 switching threshold and the -OUT output has high impedance, the first input of U4 has a high voltage due to R2, and the output of U4 is accordingly low. This output is connected to the gate of p-channel MOSFET transistor Q1. When the output of U4 is low, then the gate of Q1 is pulled low and Q1 is switched on, thus providing a voltage V1 at the "supply out" terminal, to power the temperature sensitive electrical apparatus 120.

From step S3-4, the process then continues to step S3-5. If at step S3-5, the temperature is found to exceed the threshold temperature of U1 set by resistor R1, the process continues to step S3-6, in which the output of the temperature switch -OUT is pulled low, provided that the "Keep Pwr" line is low, as discussed above. The input of U4 is thus pulled low, driving the gate of high, so that Q1 is switched off. This has the effect of cutting the power supply to the temperature sensitive apparatus 120. The process then continues to step S3-7.

However, if at step S3-4, the temperature sensitive apparatus holds the signal "Keep Pwr" high, then the circuit is prevented from turning off the power at Q1, even if the temperature passes the threshold value, because the output of U4 will remain low, keeping Q1 switched on. However, the fact that the circuit is in this state may be determined by the temperature sensitive apparatus monitoring the line "-Powering Down", which is connected to the output of U1. If the output of U1 switches to a low value to indicate that the temperature has passed the threshold, then the temperature sensitive apparatus can complete any necessary operations and then drive the line "Keep Pwr" low. This causes the power to be removed as already described, but having first allowed the necessary operations to be completed, and the process continues to step S3-6 as before. If this functionality is not required, the NOR gate U4 could be replaced by an inverter.

An alternative use of the "-Powering Down" line is as an interrupt, allowing the temperature sensitive apparatus 120 or some other control circuit to switch off the power at the "supply out" output by supplying a low voltage signal on the "-Powering Down" line, even if the temperature had not passed the threshold value.

At step S3-7, if the temperature once more crosses the threshold (plus any hysteresis), so that it is within an acceptable range once again, then the process continues to step S3-8. At step S3-8, -OUT goes high impedance again, the output of U4 is driven low and Q1 are turned on, power is restored, and the process continues as before at step S3-5.

If the temperature passes back through the threshold before the "Keep Pwr" sign is changed from high to low by the temperature sensitive apparatus, then the process simply continues from step S3-8, and then S3-5, but without any break in the power to the temperature sensitive apparatus having taken place.

If at step S3-5, the temperature has not crossed the threshold, the process goes to step S3-9. At step S3-9, if no signal is detected at the -Off input, then the process goes back to step S3-5. However, if at step S3-9, a low voltage pulse is detected at the -Off input, the process proceeds to step S3-10.

The low pulse applied to the "-Off" input causes the output of U3 to go high. This drives the output of U2 low, which holds the circuit in this state after the end of the pulse. Thus, the power supply to VCC of U1 is cut off, restoring the circuit to the state in which it started. Thus, the process moves from step S3-10 back to step S3-3 and continues in this state until a further pulse is received at the -On input.

Figure 9:
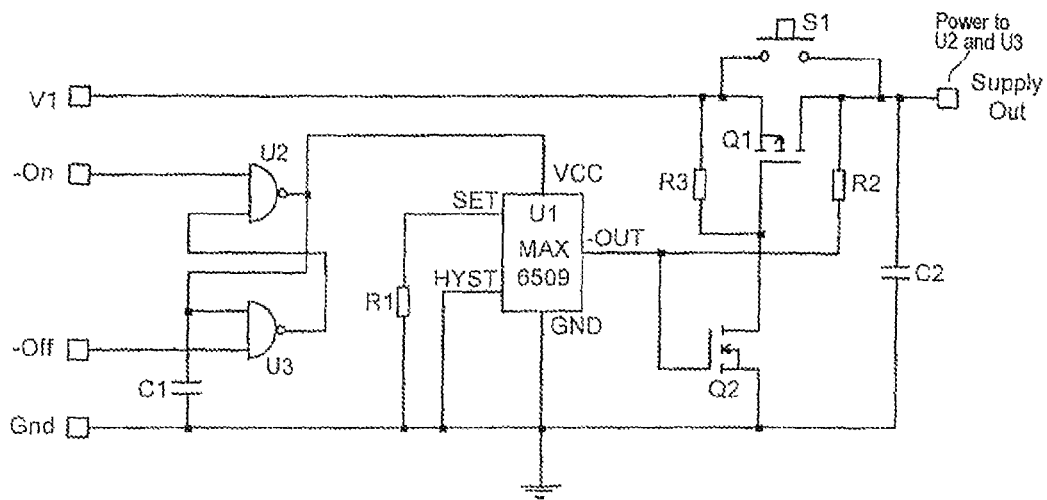
FIG. 9 is a circuit diagram corresponding to a fifth embodiment of the invention.

A fifth embodiment of the invention is shown by the circuit diagram of FIG. 9. The circuit of FIG. 9 is similar to that of FIG. 7, except for the following differences. FIG. 9 includes a switch S1 connected between the source and drain of transistor Q1. Instead of being directly connected to the V1 terminal, the resistor R2 and the positive power terminals of U2 and U3 are connected to the supply out terminal of the circuit. The gate U4 has been replaced by an N-channel FET Q2 and a resistor R3. For clarity, the "-Powering Down" output and the "Keep Pwr" input are not shown in this embodiment, although they may be included if required. Thus, when the switch S1 is closed or when Q1 is on, power will be supplied at the supply out terminal. An additional capacitor C2 is connected between the supply out and ground outputs in the circuit. Otherwise, the circuit of FIG. 9 is the same as that of FIG. 7.

In FIG. 9, switch S1 is initially in an open position. When the power source V1 is first connected, the capacitor C2 remains discharged and hence no power is supplied to the temperature sensitive circuit. Resistor R3 holds Q1 turned off, and hence the circuit remains in this state until switch S1 is closed. This powers up the rest of the circuit, which operates as described for FIG. 7 and remains powered assuming that the temperature is within the threshold. S1 is not held in a closed position, but is opened again after powering the circuit. S1 may be biased in the open position so that it will automatically return to an "open" state after being switched to a closed state.

The -On and -Off inputs are used as described earlier. If after activating U1 by means of a pulse on the -On input, the temperature crosses the threshold, then Q1 turns off. Since Q1 in FIG. 9 also switches off the input voltage to U2 and U3, then the whole circuit is powered down and remains in this state until S1 is closed again. This embodiment is therefore useful for situations where operation cannot resume when the temperature comes back to an acceptable value.

In any of the described embodiments, it is possible to replace the FETs with bipolar devices, and/or to replace NAND gates with other logic gates or gate arrangements, e.g. NOR gates, or circuits using discrete FETs or bipolar transistors (or a combination of these) having essentially the same functionality.

Figure 10:
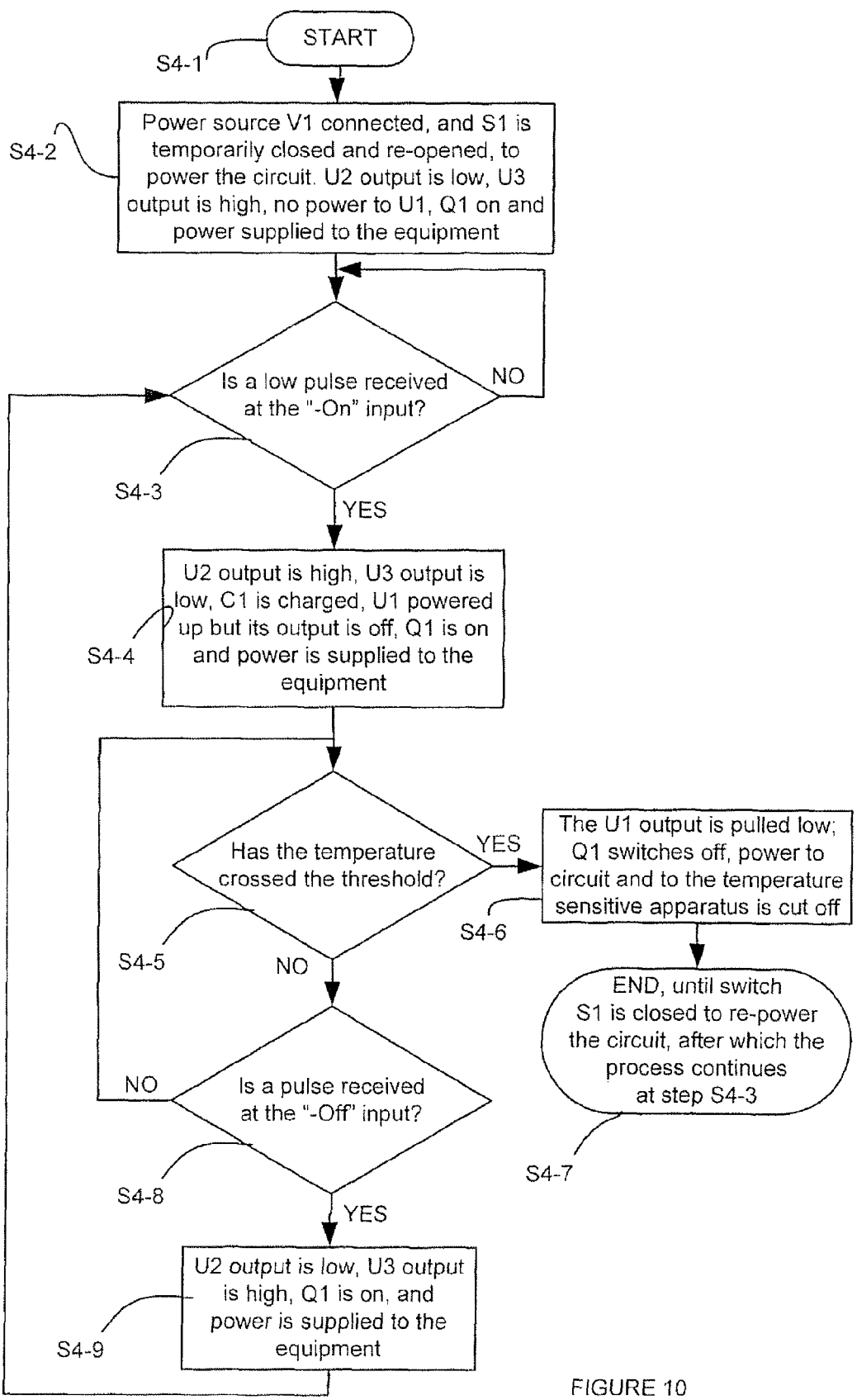
FIG. 10 is a flow diagram showing a control process carried out by the circuit of FIG. 9.

FIG. 10 is a flow chart showing the process occurring in the circuit of FIG. 9. This is similar to the process shown in FIG. 8, except that S1 needs to be temporarily closed at step S4-2, and after Q1 is switched off, the circuit remains depowered at step S4-7 until switch S1 is closed again, even if the temperature changes again to an acceptable value.

These described embodiments of the invention thus prevent an unnecessary drain on the power source (e.g. battery) of the temperature switch. This may significantly extend the battery life. In a conventional device, the temperature switch or switches would be powered continuously, even if there was no significant risk of the temperature crossing any threshold, and this is a particular problem for battery lifetime when two temperature switches are used to protect against high and low temperatures.

In embodiments of the present invention, the temperature switch is only powered up when the temperature approaches the limits. In most cases, this will seldom happen and the temperature switch will mostly remain switched off. The current taken when the temperature switch is not powered up is essentially the supply current of U2, U3 and U4, which can be made very low by suitable choice of components. In embodiments with two temperatures switches (one for high temperatures and one for low), at most one of these is powered up at any given time, thereby halving even the maximum current consumption compared with the known prior art.

Although the above embodiments are described in terms of switching a power source according to a detected temperature, it is also possible for the temperature detection circuit or other control circuitry to take other factors into account when making a power switching decision, such as whether the temperature has passed or approached the threshold on a previous occasion, or how quickly the detected temperature is changing. Any combination of such factors may be used to generate a control signal for either switching power to the temperature switch or switching off a voltage to the temperature sensitive apparatus.

While the invention has been described in terms of what are at present its preferred embodiments, it will be apparent to those skilled in the art that various changes can be made to the prior art embodiments without departing from the scope of the invention, which is defined by the claims.

The invention claimed is:

1. A temperature activated switching circuit, comprising:
   a. A temperature activated switch for switching an output at a threshold temperature, the temperature activated switch having at least one input for receiving power; and
   b. Power switching circuitry for connecting a power source to the temperature activated switch, wherein the power source is initially disconnected from the temperature activated switch, and the power switching circuitry is configured to connect said power source to the temperature activated switch according to a detected temperature, in order to power up the temperature activated switch before said detected temperature reaches said threshold temperature.

2. The circuit of claim 1, wherein the power switching circuitry is configured to connect said power source to the temperature activated switch based on a temperature difference between the detected temperature and said threshold temperature.

3. The circuit of claim 1, wherein the power switching circuitry is configured to connect said power source to the temperature activated switch based on a rate of change of said detected temperature.

4. The circuit of claim 1, wherein the power switching circuitry is configured to connect said power source to the temperature activated switch when said detected temperature within a predetermined range of the threshold temperature.

5. The circuit of claim 1, wherein the temperature-activated switch comprises a temperature sensitive component for detecting said threshold temperature.

6. The circuit of claim 1, wherein the power switching circuitry comprises field effect transistors.

7. The circuit of claim 1, wherein the power switching circuitry comprises bipolar transistors.

8. The circuit of claim 1, wherein the power switching circuitry comprises one or more logic gates.

9. The circuit of claim 1, further comprising input means for receiving a first control signal for controlling the power switching circuitry to supply power to the temperature activated switch.

10. The circuit of claim 9, wherein said first control signal comprises a pulse for switching the power switching circuitry.

11. The circuit of claim 9, wherein the power switching circuitry is configured to disconnect power from the temperature activated switch in response to a second control signal at said input means.

12. The circuit of claim 11 wherein said second control signal comprises a pulse for switching the power switching circuitry.

13. The circuit of claim 11 wherein the input means comprises a first input for receiving said first control signal and a second input for receiving said second control signal.

14. The circuit of claim 9, wherein said power switching circuitry comprises a first transistor configured to switch on in response to said first control signal to supply power to the temperature activated switch, and means for keeping the first transistor switched on in response to it being initially switched on by the first control signal.

15. The circuit of claim 14, wherein said means for keeping the first transistor switched on is configured to be deactivated if a second control signal is received at the input means.

16. The circuit of claim 11, wherein said power switching circuitry comprises a first transistor configured to switch on in response to said first control signal to connect power to the temperature activated switch, and a second transistor configured to switch on when the first transistor is initially switched on and to maintain the switched on state of the first transistor, wherein said power switching circuitry comprises means to switch off the second transistor, in response to said second control signal at the input means, thereby also switching off the first transistor.

17. The circuit of claim 1, wherein the power switching circuitry comprises a logic gate arrangement configured in a bi-stable arrangement, wherein one state of the logic gate arrangement is configured to supply power to the temperature activated switch and the other state of the logic gate arrangement is configured to disconnect power from the temperature activated switch.

18. The circuit of claim 17, wherein the logic gate arrangement comprises a bi-stable dual NAND gate configuration.

19. The circuit of claim 1, further comprising output switching means for cutting power to a power output of the circuit, said power output for providing power to a temperature sensitive electrical apparatus, the output switching means being configured to be switched by the output of the temperature activated switch.

20. The circuit of claim 19, further comprising all output connection from the output of the temperature activated switch for indicating the state of said output to said temperature sensitive apparatus, regardless of the switching state of the output switching means.

21. The circuit of claim 19, further comprising a first override input connection at the output of the temperature activated switch for receiving an override signal and applying said override signal at said output of the temperature activated switch to simulate the temperature activated switch being switched on.

22. The circuit of claims 19, further comprising a second override input for receiving an override signal from said temperature sensitive apparatus, wherein the circuit is configured to prevent the output switching means from switching off the power to the temperature sensitive apparatus when an override signal is received at the second override input.

23. The circuit of claim 22, comprising a logic gate with a first input coupled to the output of the temperate activated switch, a second input coupled to said second override input, and an output configured to control the output switching means to allow switching of the output switching means if no override signal is received at the second override input and to prevent switching of the output switching means when an override signal is received at the second override input.

24. The circuit of claim 23 wherein said logic gate is a NOR gate.

25. The circuit according to claim 1, further comprising a switch connected between the power source and the power switching circuitry, configured when open to prevent the temperature activated switch from switching on.

26. The circuit of claim 25, comprising power routing means to be activated by closing the switch, for continuing to route power to the power switching means after the switch has initially been closed, even if the switch is subsequently re-opened.

27. The circuit of claim 25, wherein said switch is configured to switch off automatically after being switched on.

28. The circuit of claim 25, wherein said switch is connected between the power source and power inputs of logic gates in the power switching means.

29. The circuit of claim 1, further comprising an alarm configured for activation when the temperature switch output is activated.

30. A circuit comprising a first temperature activated switching circuit according to claim 1, configured to switch said output above an upper threshold temperature and a second temperature activated switching circuit according to claim 1, configured to switch said output below a lower threshold temperature.

31. An electrical apparatus comprising the circuit of claim 1.

32. The electrical apparatus of claim 31, further comprising a temperature detection circuit configured to generate control signals to control the connection of a power source to the temperature activated switch by the power switching circuitry.

33. The electrical apparatus of claim 31, further comprising a power output configured to be controlled by the output of the temperature activated switch, the electrical apparatus further comprising means for generating an override control signal to maintain power at said power output regardless of the switching state of the temperature activated switch.

34. The electrical apparatus of claim 31, further comprising a power output configured to be controlled by the output of the temperature activated switch, the electrical apparatus further comprising means for generating an override control signal to cut the power at the power output regardless of the switching state of the temperature activated switch.

* * * * *